Jan. 11, 1955     H. M. JENKINS, JR     2,699,361
ORNAMENTAL ANNULUS FOR AUTOMOBILE WHEELS
Filed June 27, 1952     2 Sheets-Sheet 1
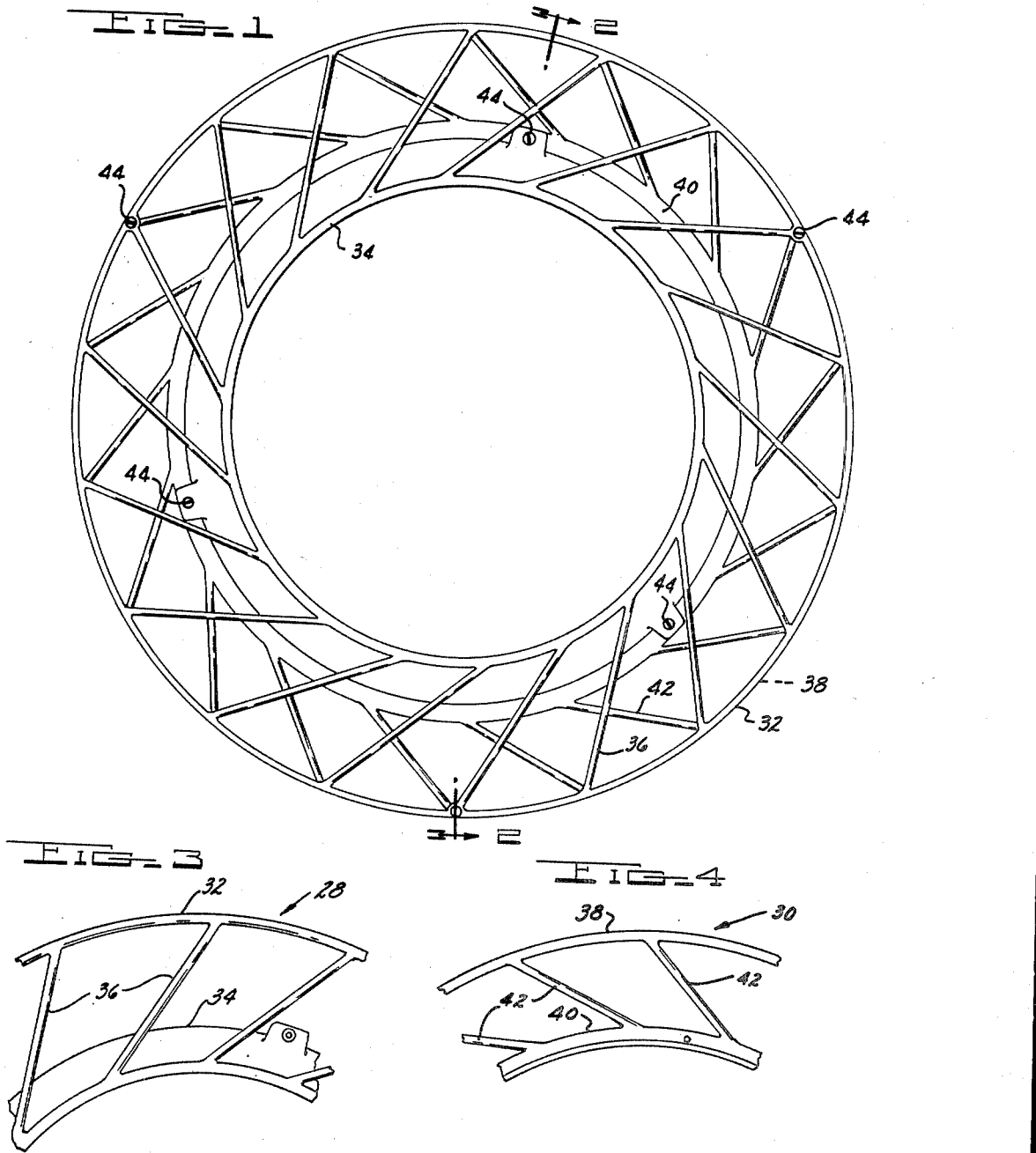
INVENTOR.
HOWARD M. JENKINS JR.
BY Arthur M. Smith
ATTORNEY Jan. 11, 1955  H. M. JENKINS, JR  2,699,361
ORNAMENTAL ANNULUS FOR AUTOMOBILE WHEELS
Filed June 27, 1952  2 Sheets-Sheet 2
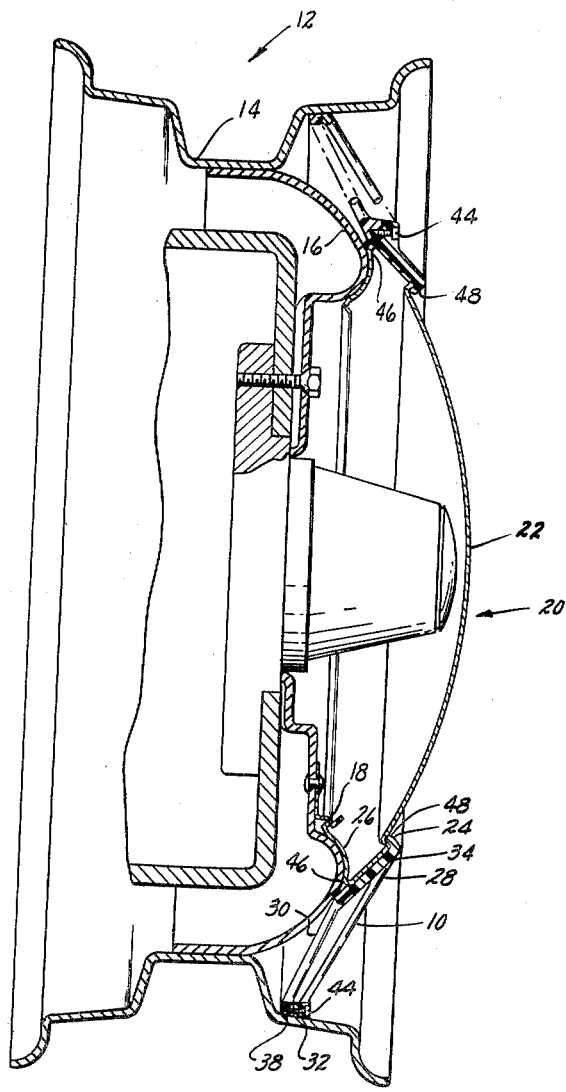
INVENTOR.
HOWARD M. JENKINS JR.
BY
Arthur W. Smith
ATTORNEY

United States Patent Office 2,699,361
Patented Jan. 11, 1955

2,699,361
ORNAMENTAL ANNULUS FOR AUTOMOBILE WHEELS

Howard M. Jenkins, Jr., Detroit, Mich., assignor to Van Auken, Inc., Detroit, Mich., a corporation of Michigan Application June 27, 1952, Serial No. 295,866

8 Claims. (Cl. 301—37)

The present invention relates to an ornamental cover member for a wheel and more particularly to an annulus adapted to be disposed between the rim and hub of an automobile wheel to simulate a wire wheel construction. The ornamental annulus disclosed in this application is a modified form of the invention disclosed in my copending application, Serial No. 295,865, filed June 27, 1952, and it also relates to the invention disclosed in my copending application, Serial No. 292,453, filed June 9, 1952.

As is explained in my aforesaid copending applications, there is a desire in the automobile industry to provide certain models of automobiles, such as convertibles or the like with wire wheel constructions because of the more attractive appearance these wheels provide. The automobile manufacturers have not responded to the demands for wheels of this type, because wire wheels are more costly to make and do not have all the strength characteristics of the conventional wheels now in use.

The present ornamental annulus has been developed as an accessory for a wheel assembly which can be installed at the factory or by the owner of either a new or used car without altering or modifying the construction of the vehicle wheel so that the wheel assembly appears to have spoke-like elements disposed between its hub and rim portions.

It is an object of the present invention to provide an ornamental wire spoke-like annulus of the foregoing character which is formed in two annular sections adapted to be superposed one on top of the other, one having spoke-like elements slanting in one direction and the other having spoke-like elements slanting in the other direction so that when superimposed such elements will be crossed to simulate wire spokes.

It is still another object of the present invention to provide an ornamental wire spoke-like annulus of the foregoing character which is made from a suitable molded plastic material which can be any desired color to effect the most desirable appearance when assembled on a wheel, and which can be manufactured in an economical manner on a mass production schedule.

It is still another object of the present invention to provide an ornamental annulus adapted to be disposed between the hub and rim portions of a wheel assembly and which is constructed and arranged so that it can be readily attached to the hub cap of the wheel assembly without requiring modification or change in any of the parts of the wheel assembly.

Other objects of this invention will appear in the following description and appended claims, reference being had to the accompanying drawings forming a part of this specification wherein like reference characters designate corresponding parts in the several views.

In the drawings:

Fig. 1 is a front elevation of an ornamental annulus for a conventional automobile assembly embodying the present invention;

Fig. 2 is a section taken on line 2—2 of Fig. 1 illustrating the annulus mounted in position on a conventional wheel assembly;

Fig. 3 is a fragmentary view of the front section of the annulus; and

Fig. 4 is a fragmentary view of the rear section of the annulus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings for a more detailed description, one embodiment of the present invention can be seen. In Fig. 2 a cross section of a wheel assembly is shown which includes the novel ornamental annulus 10. The conventional wheel 12 comprises a rim portion 14 and a body or hub portion 16. Secured to the front side of the hub portion 16 by a plurality of retaining fingers 18 is a hub cap 20 which has a dome 22 and an annular ridge 24 around its outer periphery. An inturned flange 26 seats on the hub portion 16 and is secured in place by the retaining fingers 18.

The wheel 12 and the hub cap 20 are well known constructions in the automobile industry and the specific details of these parts alone form no part of the present invention. It is to be understood that any conventional wheel and hub cap construction of the general type disclosed herein may be used with this invention.

The ornamental annulus 10 is made in two annular sections, the front section 28 and the rear section 30 which can be seen separately in Figs. 3 and 4, respectively. The front section 28 has an outer ring 32 and a relatively wider inner ring 34. Connecting said rings 32 and 34 are a plurality of spoke-like elements 36 which uniformly slant in one direction from a radial line passing through the center of the outer ring 32.

The rear section 30 likewise has an outer ring 38 and an inner ring 40 which are adapted to abut the corresponding rings on the front section 28. Connecting the rings 38 and 40 are a plurality of spoke-like elements 42 which uniformly slant in the opposite direction to those of the front section 28 so that when such sections are superposed, one against the other, the spoke-like elements 36 and 42 will simulate the crossed wire spokes of a wire wheel construction.

The front and rear sections are fastened together by screws 44 which extend through the outer and inner rings 32 and 34 and are threadedly connected respectively to the outer and inner rings 38 and 40.

In the normal use of the present invention, the annulus 10 is first secured to a hub cap which is detached from its wheel assembly. The rear section 30 is first placed in a horizontal position with its inner ring 40 uppermost. The hub cap 20 is then placed on the rear section 30 so that its outer periphery is seated on the radially inwardly projecting annular flange 46, Fig. 2. Thereafter, the front section is placed on top of the hub cap 20 and the rear section 30 and screws 44 are driven into the sections to lock them together. It will be noted that the front section also has an inwardly and rearwardly projecting annular flange 48, Fig. 2, which extends over the annular ridge 24; and thus, when the front and rear sections 28 and 30 are screwed together these annular flanges 46 and 48 rigidly clamp the outer periphery of the hub cap 20.

Thereafter, the hub cap 20 can be reattached to the wheel 12 by means of the retaining fingers 18. The ornamental annulus 10 then will be disposed between the periphery of the hub cap 20 and the rim 14 of the wheel 12. It will be noted that the outer diameter of the annulus 10 is substantially the same as the diameter of a portion of the rim 14 so that when the hub cap and annulus assembly are reattached to the wheel 12 the outer periphery of the annulus will be seated in such portion of the rim.

The ornamental annulus can be formed from any rigid material, but it is preferably made from a suitable plastic that can be molded into the two sections disclosed. In this manner, the sections can be made on a mass production schedule, and can be made in such colors as are desired.

From the foregoing description it can be understood that the annulus herein described as embodying the present invention can be easily installed on a conventional hub cap without modifying or changing the wheel or hub cap. It can be made in any color at a very nominal cost, and if desired, can be made of lightweight material so that no unnecessary weight is added to the wheel assembly.

The hub cap 20 having the annular ridge 24 is shown by way of example only, and if desired hub caps having other contours or shapes of the dome 22 may be used.

Having thus described my invention, I claim:

1. A wheel cover assembly for a motor vehicle comprising a hub cap adapted to be secured to a wheel, a spoke-like annulus formed in two coaxially disposed sections engaging opposite sides of the periphery of the hub cap, and means to secure said sections together.

2. A wheel cover assembly comprising a vehicle hub cap having a dome portion on its front side with a ridge around the dome portion, an annulus formed in two coaxial sections engaging the front and rear peripheral edges of the hub cap, the front section having a flange on its inner periphery overlapping the ridge on the hub cap, and means for securing said sections together.

3. A wheel cover assembly comprising a vehicle hub cap having a dome portion on its front side with a ridge around the dome portion, an annulus formed in two coaxial sections, the front section having a flange on its inner periphery overlapping the ridge on the hub cap, the rear section having a flange on its inner periphery overlapping a rear portion of the hub cap, and means for securing said sections together so that the periphery of the hub cap is engaged between said sections.

4. In a wheel assembly including a wheel with rim and hub parts and a hub cap disposed over the hub part, an annulus formed from two plastic annular sections engaging the front and rear sides of the hub cap periphery, said sections extending from the hub cap periphery to a rim part, and means securing said sections together so that they grip the periphery of said hub cap.

5. In a wheel assembly including a wheel with rim and hub parts and hub cap disposed over the hub part, an annulus formed from two annular sections engaging the front and rear sides of the hub cap periphery, said sections having a plurality of spoke-like elements extending between the periphery of the hub cap and said rim part, and means securing said sections together so that they grip the periphery of said hub cap.

6. As an article of manufacture, an ornamental wheel cover structure for disposition between the rim and hub cap of a wheel assembly comprising two separate coaxial annular sections, said sections having lip portions extending from their inner peripheries in a generally radially inwardly direction so as to fit over opposite front and rear sides of the periphery of a hub cap, and clamp means associated with said sections for drawing said lip portions together so that said sections can be clamped to the periphery of a hub cap.

7. As an article of manufacture, an ornamental wheel cover structure for disposition between the rim and hub cap of a wheel assembly comprising two separate coaxial annular sections, each section including spoke-like elements extending from the radial inner to the radial outer portions thereof, said sections having lip portions extending from their inner peripheries in a generally radially inwardly direction so as to fit over opposite front and rear sides of the periphery of a hub cap, and clamp means associated with said sections for drawing said lip portions together so that said sections can be clamped to the periphery of a hub cap.

8. As an article of manufacture, an ornamental wheel cover structure for disposition between the rim and hub cap of a wheel assembly comprising two separate coaxial annular sections, said sections including spoke-like elements extending from the radial inner to the radial outer portions thereof, the spoke-like elements in the forward section being angularly disposed in one direction to radii of the section, the spoke-like elements in the rear section being angularly disposed in an opposite direction, said sections having lip portions extending from their inner peripheries in a generally radially inwardly direction so as to fit over opposite front and rear sides of the periphery of a hub cap, and clamp means associated with said sections for drawing said lip portions together so that said sections can be clamped to the periphery of a hub cap.

References Cited in the file of this patent

UNITED STATES PATENTS

| | | |
|---|---|---|
| 1,490,574 | MacGregor | Apr. 15, 1924 |
| 2,368,251 | Lyon | Jan. 30, 1945 |

FOREIGN PATENTS

| | | |
|---|---|---|
| 714,587 | France | Nov. 17, 1931 |
| 769,819 | France | Sept. 3, 1934 |